United States Patent
Soga et al.

(10) Patent No.: US 6,902,027 B2
(45) Date of Patent: Jun. 7, 2005

(54) PIPING STRUCTURE OF CRAWLER DRIVING HYDRAULIC MOTOR

(75) Inventors: Kazuo Soga, Komatsu (JP); Eiji Ishibashi, Komatsu (JP)

(73) Assignee: Komatsu Ltd., Tokyo (JP)

( * ) Notice: Subject to any disclaimer, the term of this patent is extended or adjusted under 35 U.S.C. 154(b) by 11 days.

(21) Appl. No.: 10/053,959

(22) Filed: Jan. 24, 2002

(65) Prior Publication Data
US 2002/0113433 A1 Aug. 22, 2002

(30) Foreign Application Priority Data
Feb. 21, 2001 (JP) ........................................ 2001-045857

(51) Int. Cl.$^7$ ............................................. B62D 21/03
(52) U.S. Cl. ...................... 180/308; 180/6.7; 296/204; 280/797
(58) Field of Search ................................ 180/305, 308, 180/311, 312, 6.7, 9.1, 89.12; 280/781, 797; 296/204

(56) References Cited

U.S. PATENT DOCUMENTS

| | | | | |
|---|---|---|---|---|
| 3,529,687 A | * | 9/1970 | Pietro ........................ 180/6.48 |
| 3,656,642 A | * | 4/1972 | Kostas et al. ................ 214/140 |
| 3,767,254 A | * | 10/1973 | Skanes et al. ............ 296/28 R |
| 3,789,942 A | * | 2/1974 | Kowalik ..................... 180/9.44 |
| 3,797,598 A | * | 3/1974 | Wanner ...................... 180/6.48 |
| 3,895,728 A | * | 7/1975 | Heggen ....................... 214/140 |
| 3,924,702 A | * | 12/1975 | Heggen ....................... 180/6.48 |
| 3,963,131 A | * | 6/1976 | Dimmer ...................... 214/140 |
| 4,055,262 A | * | 10/1977 | Bauer et al. ................. 214/140 |
| 4,151,920 A | * | 5/1979 | Shoup ........................ 414/697 |
| 4,220,215 A | * | 9/1980 | Stark .......................... 180/6.7 |
| 4,537,268 A | * | 8/1985 | Fukushima et al. .......... 180/9.1 |
| 4,616,957 A | * | 10/1986 | Burrows et al. ............. 405/179 |
| 5,531,282 A | * | 7/1996 | Jennen ........................ 180/9.1 |
| 5,894,908 A | * | 4/1999 | Eftefield ...................... 280/781 |
| 6,719,075 B2 | * | 4/2004 | Kamikawa ................... 180/9.1 |
| 2002/0023786 A1 | * | 2/2002 | Kamikawa ................... 180/6.7 |

FOREIGN PATENT DOCUMENTS

JP 9202150 8/1997
JP 2002-59864 A * 2/2002

* cited by examiner

Primary Examiner—Christopher P. Ellis
Assistant Examiner—Jeff Restifo
(74) Attorney, Agent, or Firm—Varndell & Varndell, PLLC

(57) ABSTRACT

A piping structure of a crawler driving hydraulic motor able to reduce a reduction in strength of a vehicle body frame and shorten the exposure length of a hydraulic piping in the exterior of the vehicle body frame, and reduce a damage opportunity due to an external obstacle, etc. Therefore, the hydraulic piping is connected from a hydraulic pump arranged within the vehicle body frame to left-hand and right-hand crawler driving hydraulic motors respectively attached to one-end sides of left-hand and right-hand crawler track frames arranged on left-hand and right-hand outsides of the vehicle body frame. The hydraulic piping extends through a frame rear wall constituting the vehicle body frame, and is taken out to the exterior of the vehicle body frame, and is connected to the left-hand and right-hand crawler driving hydraulic motors.

8 Claims, 7 Drawing Sheets

US 6,902,027 B2

PIPING STRUCTURE OF CRAWLER DRIVING HYDRAULIC MOTOR

BACKGROUND OF THE INVENTION

1. Field of the Invention

The present invention relates to a hydraulic piping structure for connecting a hydraulic pump of a crawler-type hydraulic driving vehicle and a drawer driving hydraulic motor.

2. Description of the Related Art

Japanese Patent Laid-Open No. 202150/1997 discloses one example of a hydraulic piping structure for connecting a hydraulic pump arranged within a vehicle body frame, and a crawler driving hydraulic motor arranged in each of longitudinal end portions of a pair of track frames arranged on left-hand and right-hand sides of the vehicle body frame in a conventional crawler-type hydraulic driving wheel such as a bulldozer.

FIG. 6 is a side view of a hydraulic hose piping structure of a crawler-type travel device disclosed in Japanese Patent Laid-Open No. 202150/1997. FIG. 7 is a plan view of the hydraulic hose piping structure. In FIGS. 6 and 7, a hydraulic pump 10 is arranged inside a vehicle body frame 1. Left-hand and right-hand track frames 4L, 4R (4R is omitted in these figures) are attached to both left-hand and right-hand sides of the vehicle body frame 1 in parallel with forward and backward directions. Left-hand and right-hand crawler driving hydraulic motors 11L, 11R are respectively attached to one-end portions of the left-hand and right-hand track frames 4L, 4R in the forward and backward directions. The hydraulic pump 10 and the left-hand and right-hand crawler driving hydraulic motors 11L, 11R are connected by four hydraulic pipings 30a, 30b, 30c, 30d. Each of hydraulic pipings 30a, 30b is inserted into a communication hole 31 arranged in a side face portion of the vehicle body frame 1 and is piped. Each of hydraulic pipings 30c, 30d is inserted into a guide rod 32 arranged in a lower portion of the vehicle body frame 1 and is piped. A connection plate 33 is arranged above passing positions of the hydraulic pipings 30a, 30b, 30c, 30d to protect these hydraulic pipings.

However, there are the following problems in the above construction of the prior art.

(1) The communication hole 31 is bored on each of left-hand and right-hand side faces of the vehicle body frame 1 in its longitudinal direction (i.e., the forward and backward directions) to pipe the hydraulic pipings 30a, 30b. Therefore, strength of the vehicle body frame 1 is reduced. Accordingly, it is necessary to thicken a plate thickness and arrange a reinforcing member to reinforce the vehicle body frame 1.

(2) The hydraulic pipings 30a, 30b, 30c, 30d extend through the left-hand and right-hand side faces of the vehicle body frame 1 from its inside and are taken out to the exterior, and are connected to the left-hand and right-hand crawler driving hydraulic motors 11L, 11R. Therefore, a portion of the hydraulic pipings exposed to the exterior of the vehicle body frame 1 is lengthened, and upper and side portions of the hydraulic pipings in E-portions are exposed to the exterior as shown in FIG. 7, and a lower portion of the hydraulic pipings is also exposed as shown in FIG. 6. Accordingly, there is a fear that the hydraulic pipings easily come in contact with an external rock, an obstacle, etc. and are damaged.

SUMMARY OF THE INVENTION

The present invention is made in view of the above problems, and an object of the present invention is to provide a piping structure of a crawler driving hydraulic motor able to reduce a reduction in strength of a vehicle body frame and shorten the exposure length of a hydraulic piping in the exterior of the vehicle body frame, and reduce a damage opportunity due to an external obstacle, etc.

To achieve the above object, a first invention resides in a piping structure of a crawler driving hydraulic motor connected from a hydraulic pump arranged within a vehicle body frame of a crawler-type vehicle to crawler driving hydraulic motors attached to one-end sides of crawler track frames on left-hand and right-hand outsides of the vehicle body frame, wherein the hydraulic piping from the hydraulic pump extends through a frame rear wall constituting the vehicle body frame, and is taken out to the exterior of the vehicle body frame, and is connected to the left-hand and right-hand crawler driving hydraulic motors.

In the construction of a second invention, in the first invention, the crawler driving hydraulic motors are projected and attached to a rear side from the vehicle body frame rear wall in both end side positions of a rear cross member for coupling the vehicle body frame and the left-hand and right-hand crawler track frames, and the hydraulic piping extending through the vehicle body frame rear wall from the interior of the vehicle body frame and taken out to the exterior is arranged along an outside surface of the vehicle body frame rear wall, and is then connected to the left-hand and right-hand crawler driving hydraulic motors.

In accordance with the first and second inventions, the hydraulic piping from the hydraulic pump is taken out to the frame exterior by boring a hydraulic piping insertion hole in the frame rear wall constituting the vehicle body frame. However, since no frame rear wall corresponds to a main strength member of the vehicle body frame, an influence of the hydraulic piping insertion hole bored in the frame rear wall on vehicle body frame strength is small.

Further, since the hydraulic piping is taken out to the exterior from the insertion hole formed in the vehicle body frame rear wall in proximity to the left-hand and right-hand crawler driving hydraulic motors, the length of the hydraulic piping exposed to the exterior can be shortened and the construction of a protecting means for preventing damage of the piping can be simplified.

In accordance with the construction of a third invention, in the second invention, the hydraulic piping taken out to the exterior from the vehicle body frame rear wall and connected to the left-hand and right-hand crawler driving hydraulic motors is covered and protected by a cover for covering an outside wall face of the vehicle body frame rear wall in a box shape, and motor covers for covering a space extending from an opening of the box type cover to openings of peripheral frames surrounding the driving hydraulic motors.

In accordance with the third invention, in the hydraulic piping taken out to the exterior from the above frame rear wall, a piping portion arranged along the frame rear wall is surrounded by the box type cover for covering the outside surface of the frame rear wall, and a piping portion crossing piping connection sides of the hydraulic driving motors from the frame rear wall is surrounded by the motor covers for covering the openings of the motor peripheral frames surrounding the above driving hydraulic motors from the opening of the above box type cover. Accordingly, there is no fear that the piping structure is damaged in contact with external earth and sand, rocks and obstacles.

DESCRIPTION OF THE PREFERRED EMBODIMENTS

The embodiment modes of a piping structure of a crawler driving hydraulic motor in the present invention will next be described in detail with reference to the drawings.

Figure 1:
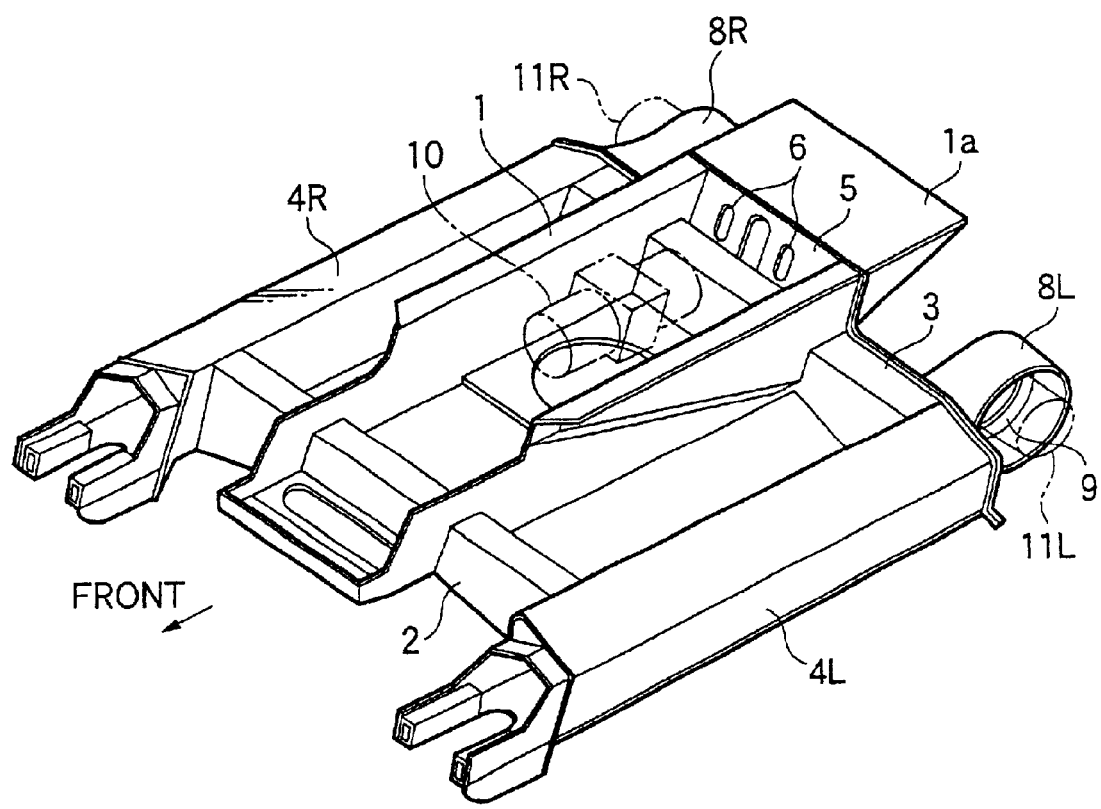
FIG. 1 is a perspective view of a vehicle body frame in a piping structure of the present invention.

FIG. 1 is a perspective view showing the construction of a vehicle frame of a crawler-type hydraulic driving travel vehicle having a crawler driving hydraulic motor.

The vehicle body construction is formed by a pair of left-hand and right-hand vehicle body frames 1 for mounting and supporting an unillustrated engine, a driver's operating seat and a hydraulic pump 10, a front cross member 2 and a rear cross member 3 transversally crossing positions of the above vehicle body frames 1 on their forward and backward sides on longitudinal bottom sides of these vehicle body frames 1, and left-hand and right-hand track frames 4L, 4R. The left-hand and right-hand track frames 4L, 4R are located in parallel with left-hand and right-hand positions of the above pair of left-hand and right-hand vehicle body frames 1, and are arranged on both end sides of the above front cross member 2 and the rear cross member 3. The above pair of left-hand and right-hand vehicle body frames 1 is integrally coupled to the above front cross member 2 and the rear cross member 3 so that the above front cross member 2 and the rear cross member 3 and the above left-hand and right-hand track frames 4L, 4R are integrally fixed and coupled to each other.

In the construction of the vehicle body frame, a frame rear wall 5 is arranged and attached between rear ends of the above pair of left-hand and right-hand vehicle body frames 1. The hydraulic pump 10 as a hydraulic supply source to left-hand and right-hand crawler driving hydraulic motors 11L, 11R is arranged in the frame interior surrounded by the frame rear wall 5 and the above pair of left-hand and right-hand vehicle body frames 1. A piping insertion hole 6 for inserting a hydraulic piping 12 from the hydraulic pump 10 into the frame exterior is formed in the above frame rear wall 5.

An attaching frame body 9 of the crawler driving hydraulic motors 11L, 11R is offset and attached to the above left-hand and right-hand track frames 4L, 4R near a side of the above rear cross member. The above offset and attached attaching frame body 9 of the crawler driving hydraulic motors 11L, 11R is projected to a rear side from the above frame rear wall 5 and is coupled and fixed to rear faces of the above rear cross member 3 on its both end sides. The crawler driving hydraulic motors 11L, 11R are attached to the above attaching frame body 9, and are surrounded and protected by motor peripheral frames 8L, 8R.

Figure 2:
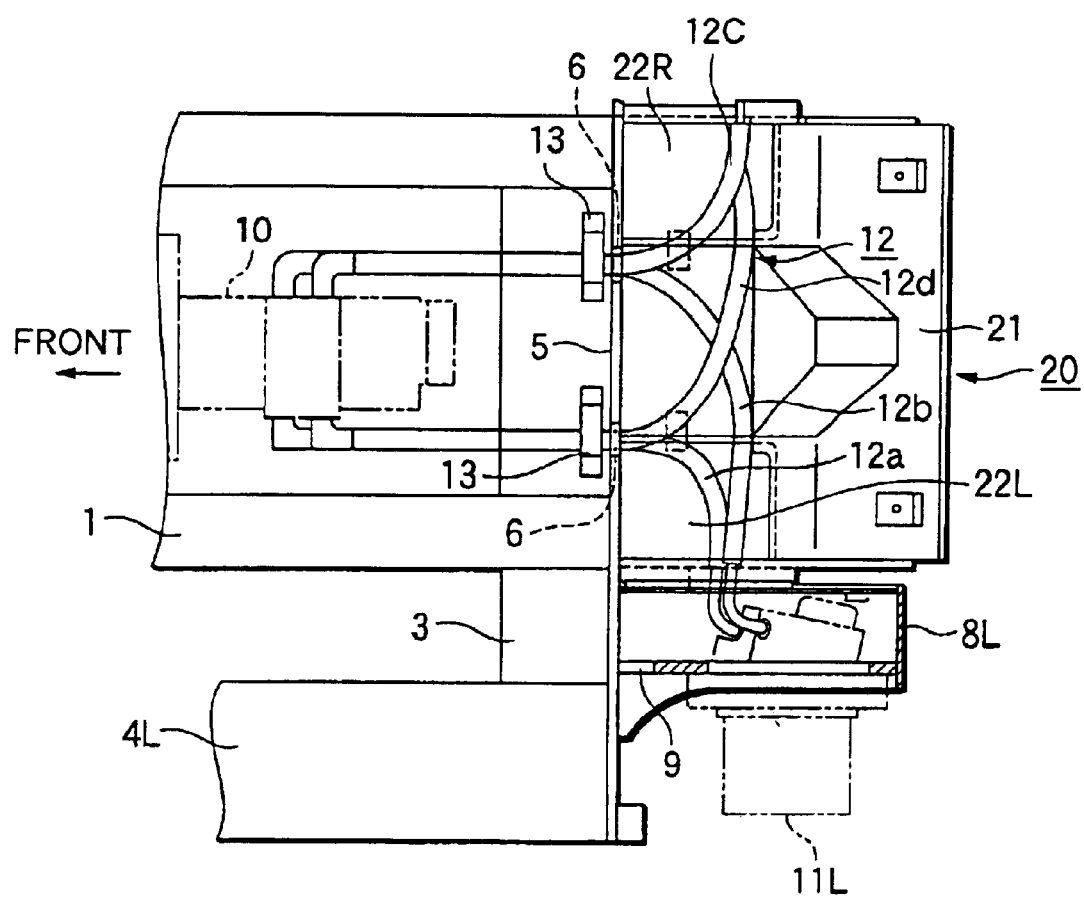
FIG. 2 is a partial sectional plan view for explaining the piping structure of the present invention.
Figure 3:
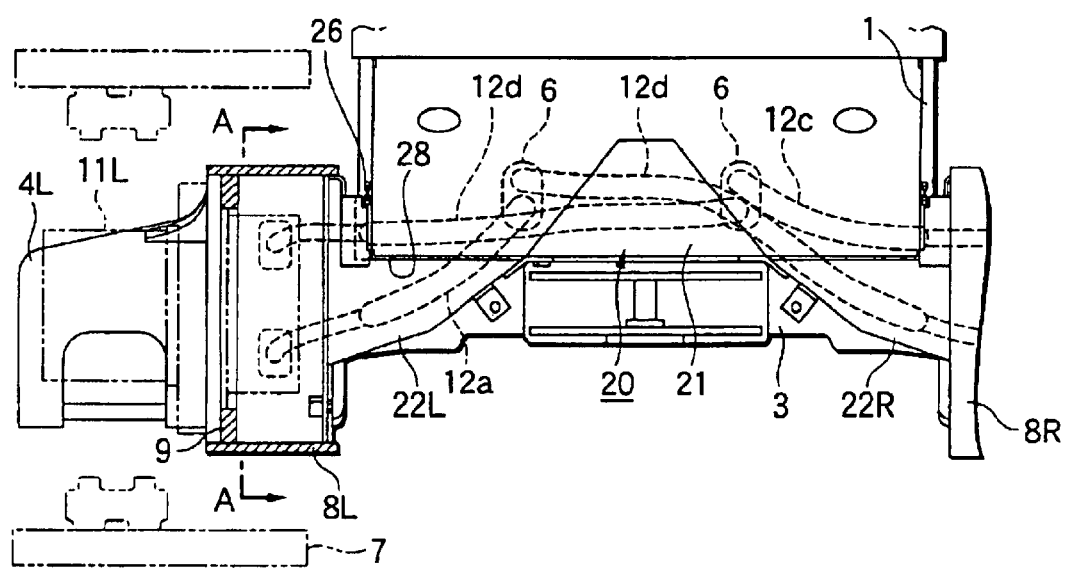
FIG. 3 is a partial sectional rear view for explaining the piping structure of the present invention.
Figure 4:
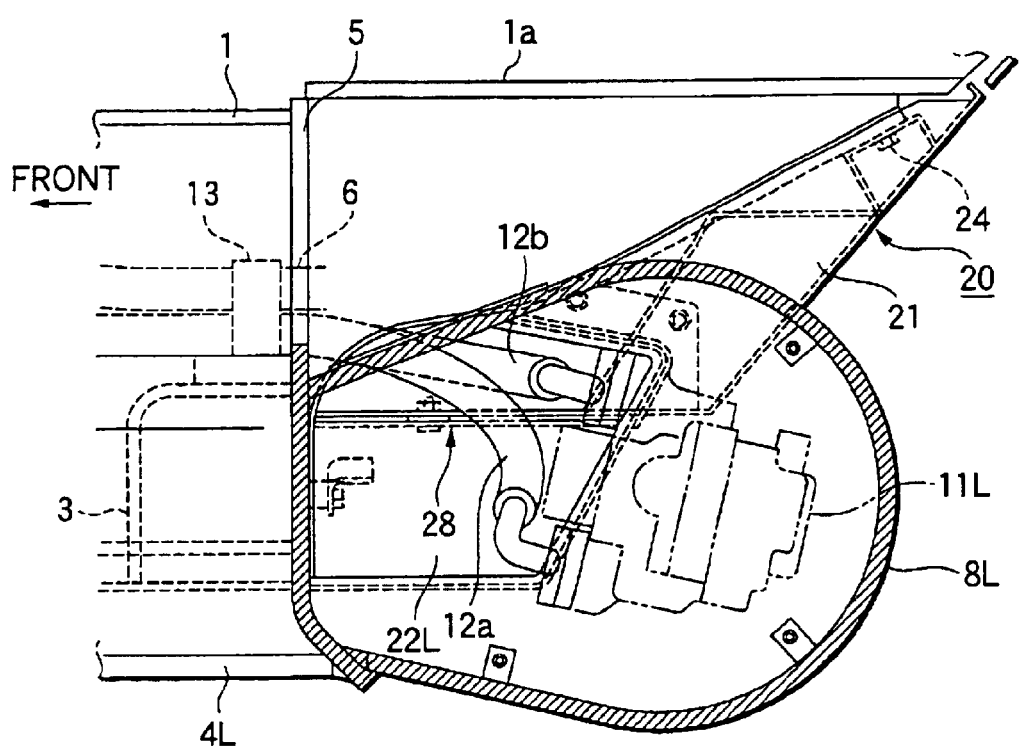
FIG. 4 is a view taken along an A—A arrow of FIG. 3.

FIG. 2 is a partial sectional plan view showing the construction of the hydraulic piping 12 connecting the hydraulic pump 10 and the left-hand and right-hand crawler driving hydraulic motors 11L, 11R. FIG. 3 is a partial sectional rear view of this construction. FIG. 4 is a view taken along an A—A arrow of FIG. 3. In FIGS. 2 to 4, the hydraulic piping 12 connecting the hydraulic pump 10 and the left-hand and right-hand crawler driving hydraulic motors 11L, 11R is constructed by four hydraulic pipings 12a, 12b, 12c, 12d in total constructed by two hydraulic pipings on each of the left-hand and right-hand sides. The four hydraulic pipings 12a, 12b, 12c, 12d from the hydraulic pump 10 are inserted into two insertion holes 6, 6 arranged in the above frame rear wall 5 of the vehicle body frame 1 every two hydraulic pipings, and are then arranged along a frame rear wall face. Hydraulic pipings 12a, 12b are connected to the left-hand crawler driving hydraulic motor 11L, and hydraulic pipings 12c, 12d are connected to the right-hand crawler driving hydraulic motor 11R. The four hydraulic pipings 12a, 12b, 12c, 12d are respectively clamped by clamps 13, 13 arranged within the vehicle body frame 1 in the vicinity of the insertion holes 6, 6. A piping cover 20 for covering the hydraulic piping 12 is arranged between the above frame rear wall 5 and the left-hand and right-hand crawler driving hydraulic motors 11L, 11R. In FIG. 3, a crawler 7 is wound around outer circumferential portions of the left-hand and right-hand track frames 4L, 4R and an unillustrated idler and an unillustrated sprocket attaching each of the left-hand and right-hand crawler driving hydraulic motors 11L, 11R thereto.

Figure 5:
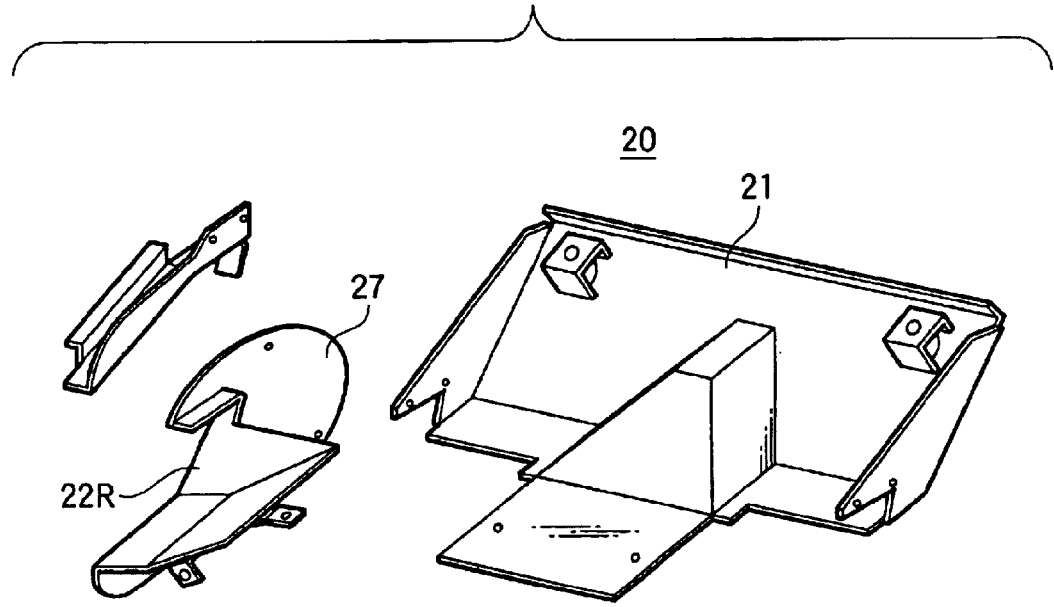
FIG. 5 is an exploded perspective view of a piping cover of the present invention.
Figure 6:
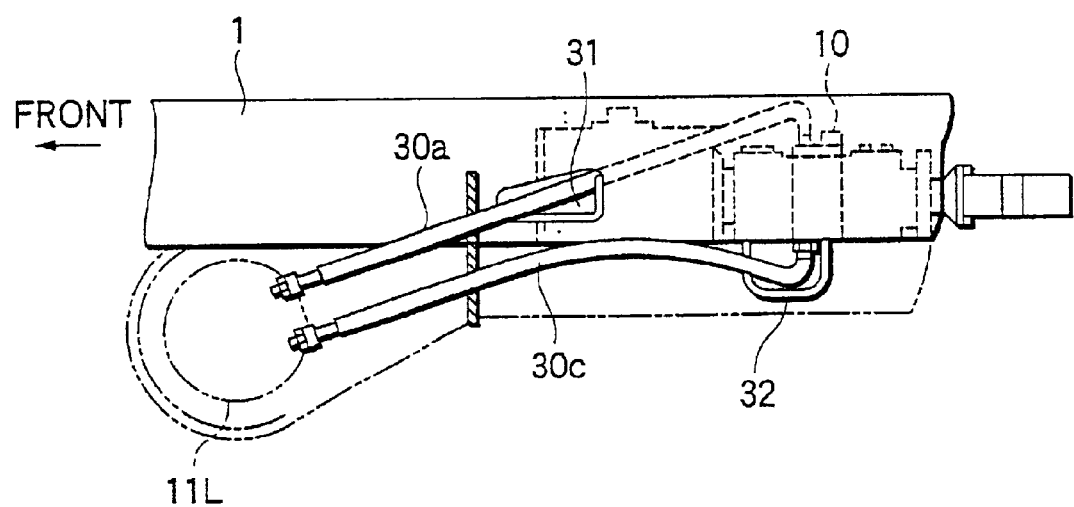
FIG. 6 is a side view showing an example of the piping structure of a conventional hydraulic pump and a crawler driving hydraulic motor.
Figure 7:
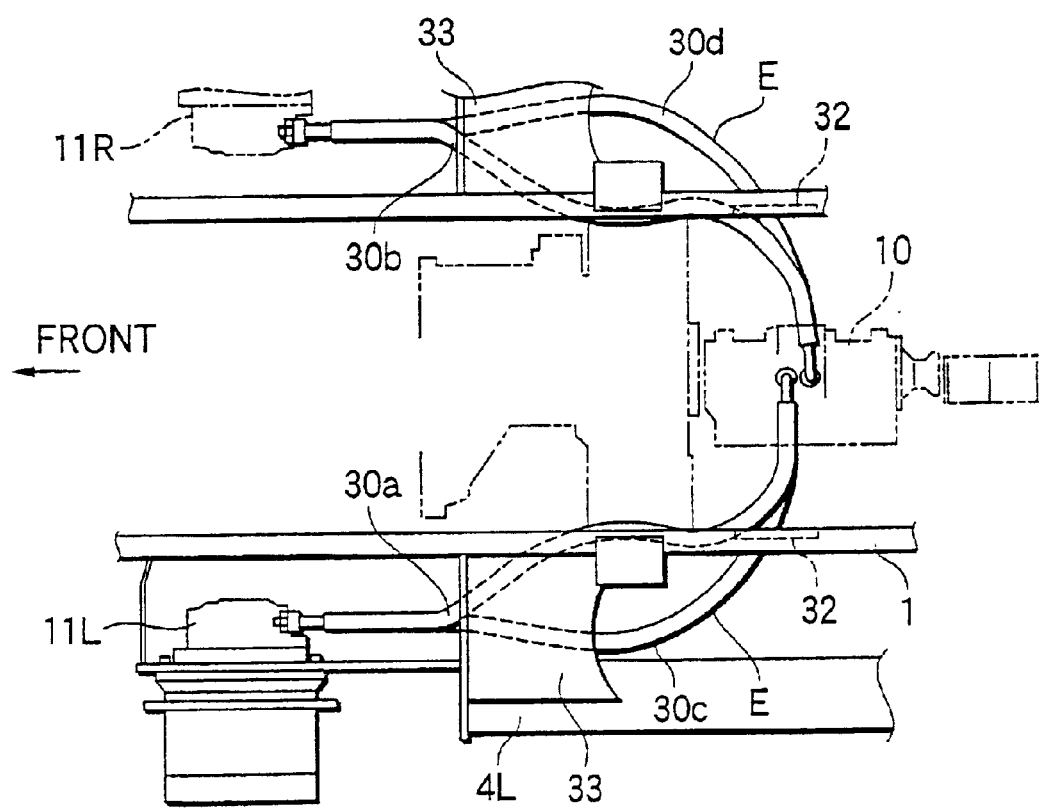
FIG. 7 is a plan view of the piping structure of FIG. 6.

FIG. 5 is an exploded perspective view of the piping cover 20. In FIGS. 2 to 5, the piping cover 20 has a box type cover 21 for covering an outside surface of the frame rear wall, and motor covers 22L, 22R for covering a space extending from a lower opening of this box type cover 21 to openings of the motor peripheral frames 8L, 8R surrounding the above driving hydraulic motors 11L, 11R. In FIG. 5, the pair of left-hand and right-hand covers 22L is omitted.

The above box type cover 21 is attached by plural bolts 24 to a lower portion of a bracket 1a fixedly attached to the frame rear wall 5 shown in FIG. 4 so as to cover a space of the frame rear wall 5 on its outside surface side. The box type cover 21 covers the hydraulic pipings 12a, 12b arranged by taking each of these pipings out of the insertion hole 6 of the frame rear wall 5.

The above motor covers 22L, 22R are constructed by passage cover portions 22L, 22R covering the lower opening space of the above box type cover, and a cover portion 27 for covering an inside space of the motor peripheral frames 8L, 8R integrally coupled to these passage cover portions 22L, 22R. The motor covers 22L, 22R are attached between the above box type cover 21 and the above motor peripheral frames 8L, 8R, and cover the hydraulic pipings 12a, 12b arranged by crossing the crawler driving hydraulic motors from the lower opening 28 of the box type cover 21.

Since the piping structure of the crawler driving hydraulic motor and the piping cover in the present invention are constructed as mentioned above, the following effects are obtained.

Even when the piping insertion hole 6 for taking-out the hydraulic motor piping from the frame interior to the frame exterior is arranged in the frame rear wall 5, no frame rear wall 5 corresponds to a main strength member of the vehicle body frame so that an influence of the piping insertion hole on strength is small.

Since the hydraulic pump 10 within the frame and the crawler driving hydraulic motors 11L, 11R outside the frame are arranged across the frame rear wall 5, the length of the hydraulic pipe exposed to the exterior is shortened so that the piping can be made compact and a piping work can be easily made.

Further, since there are no other mounting members in a rear lower portion of the vehicle body frame 1, it is easy to approach the hydraulic piping, and piping work and maintenance properties are preferable.

The hydraulic piping exposed to the exterior of the vehicle body frame 1 from the frame rear wall 5 between the left-hand and right-hand crawler driving hydraulic motors 11L, 11R located on both end sides of the rear cross member 3 is covered with the piping cover. Accordingly, it is possible to prevent the hydraulic piping from being damaged so that reliability can be further improved. Further, since the external exposure length of the hydraulic piping is short, the piping cover can be made compact so that the piping structure is made light in weight and is reduced in cost.

What is claimed is:

1. A piping structure of a crawler vehicle, which comprises:
    a vehicle body frame including left-hand and right-hand frame members and a rear frame wall member extending between and joining the left-hand and right-hand frame members, left-hand and right-hand crawler track frames respectively arranged outside the left-hand and right-hand frame members of the vehicle body frame, the rear frame wall member of the vehicle body frame extending to rear end faces of the left-hand and right-hand crawler track frames;
    a hydraulic pump arranged within an interior of the vehicle body frame defined by the left-hand and right-hand frame members and the rear frame wall member;
    left-hand and right-hand driving crawler hydraulic motors being secured to an exterior of the vehicle body frame defined by the left-hand and right-hand frame members and the rear frame wall member; and
    a piping structure extending from the hydraulic pump arranged within the interior of the vehicle body frame, the piping structure passing through piping holes in the vehicle body frame to the exterior of the vehicle body frame, and the piping structure connecting to the left-hand and right-hand crawler driving hydraulic motors.

2. A piping structure of a crawler vehicle according to claim 1, wherein the left-hand and right-hand driving crawler driving hydraulic motors project rearward and are attached to the rear frame wall member of the vehicle body frame, the rear frame wall member of the vehicle body frame coupling the left-hand and right-hand frame members of the vehicle body frame to the left-hand and right-hand crawler track frame members, and the left-hand and right-hand driving crawler hydraulic motors are respectively arranged behind the left-hand and right-hand crawler track frame members.

3. The piping structure of a crawler vehicle according to claim 1, wherein the rear frame wall extends vertically.

4. A piping structure arranged within a crawler vehicle, which comprises:
    the crawler vehicle including a vehicle body frame, the vehicle body frame including an interior defined by the rear frame wall;
    left-hand and right-hand crawler track frames being respectively secured on left-hand and right-hand exterior sides of the vehicle body frame, the rear frame wall of the vehicle body frame extending to rear end faces of the left-hand and right-hand crawler track frames;
    left-hand and right-hand crawler driving hydraulic motors being arranged outside the vehicle body frame and respectively secured to the rear frame wall of the vehicle body;
    a hydraulic pump being arranged within the interior of the vehicle body frame of the crawler vehicle; and
    hydraulic piping connecting the hydraulic pump to the left-hand and right-hand crawler driving hydraulic motors; the hydraulic piping extending from the interior of the vehicle body frame, through piping holes in the rear frame wall of the vehicle body frame, and to the outside of the vehicle body frame.

5. The piping structure arranged within a crawler vehicle according to claim 4, wherein:
    the left-hand and right-hand crawler driving hydraulic motors project rearward from the rear frame wall of vehicle body frame;
    the rear frame wall of the vehicle body frame joins the vehicle body frame to the left-hand to right-hand crawler track frames, and
    the hydraulic piping is arranged along an outside surface of the rear frame wall of vehicle body frame.

6. The piping structure of a crawler vehicle according to claim 4, wherein the rear frame wall extends vertically.

7. A piping structure of a crawler vehicle, which comprises:
    a hydraulic pump arranged within a vehicle body frame of a crawler-type vehicle and connected by hydraulic piping to left-hand and right-hand crawler driving hydraulic motors, left-hand and right-hand crawler track frames respectively arranged on left-hand and right-hand outsides of the vehicle body frame, the vehicle body frame including a rear frame wall extending to rear end faces of the left-hand and right-hand crawler track frames, the left-hand and right-hand crawler driving hydraulic motors being respectively arranged behind the left-hand and right-hand crawler track frames and secured to the rear frame wall of the vehicle body frame;
    the hydraulic piping extending from the hydraulic pump within the vehicle body frame through piping holes in the rear frame wall of the vehicle body frame to an exterior of the vehicle body frame, and the hydraulic piping being connected to the left-hand and right-hand crawler driving hydraulic motors;
    a piping cover having a box shape and covering an outside wall face of the rear frame wall of the vehicle body frame rear wall, the piping cover enclosing the hydraulic piping arranged on the exterior of the vehicle body frame; and
    motor covers respectively covering a space extending from an opening of the piping cover to openings of peripheral frames surrounding the left-hand and right-hand driving hydraulic motors.

8. The piping structure of a crawler vehicle according to claim 7, wherein the rear frame wall extends vertically.

* * * * *